United States Patent
Nakayama et al.

(10) Patent No.: US 9,612,597 B2
(45) Date of Patent: Apr. 4, 2017

(54) APPARATUS FOR CONTROLLING AUTONOMOUSLY NAVIGATING UTILITY VEHICLE

(71) Applicant: HONDA MOTOR CO., LTD., Tokyo (JP)

(72) Inventors: Keiichi Nakayama, Wako (JP); Yuki Matsui, Wako (JP); Makoto Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 14/834,952

(22) Filed: Aug. 25, 2015

(65) Prior Publication Data

US 2016/0062358 A1 Mar. 3, 2016

(30) Foreign Application Priority Data

Aug. 27, 2014 (JP) .................... 2014-172443

(51) Int. Cl.
| | |
|---|---|
| G05D 1/00 | (2006.01) |
| G01P 21/00 | (2006.01) |
| G01D 5/20 | (2006.01) |
| G05D 1/02 | (2006.01) |

(52) U.S. Cl.
CPC ......... *G05D 1/0088* (2013.01); *G01D 5/2006* (2013.01); *G01P 21/00* (2013.01); *G05D 1/027* (2013.01); *G05D 1/0265* (2013.01); *G05D 1/0274* (2013.01); *G05D 2201/0208* (2013.01)

(58) Field of Classification Search
CPC .... G05D 1/0088; G05D 1/0265; G05D 1/027; G05D 1/0274; G05D 2201/0208; G01D 5/2006; G01P 21/00
See application file for complete search history.

(56) References Cited

U.S. PATENT DOCUMENTS

| | | | |
|---|---|---|---|
| 8,532,864 B2 * | 9/2013 | Sato .................... | G05D 1/0259 700/254 |
| 8,744,663 B2 | 6/2014 | Sato et al. | |
| 9,321,498 B2 * | 4/2016 | Oikawa ................ | B62K 3/007 |
| 2012/0083961 A1 * | 4/2012 | Sato .................... | G05D 1/0259 701/25 |
| 2012/0083963 A1 * | 4/2012 | Sato .................... | G05D 1/0259 701/25 |
| 2014/0330507 A1 * | 11/2014 | Oikawa ................ | B62K 3/007 701/124 |

* cited by examiner

*Primary Examiner* — Anne M Antonucci
(74) *Attorney, Agent, or Firm* — Rankin, Hill & Clark LLP

(57) ABSTRACT

In an autonomously navigating utility vehicle adapted to run a working area defined by a laid boundary wire autonomously having a pair of magnetic sensors installed on either sides of the vehicle at positions laterally symmetrical with respect to a vehicle straight forward center line to produce outputs indicating intensity of magnetic field of the wire, an angular velocity sensor adapted to produce an output indicating angular velocity around a vertical axis of the vehicle, the vehicle is controlled to move to a prescribed position at which an angle of the center line relative to the laid wire becomes a reference angle based on the outputs of the magnetic sensors, and to turn by 180 degrees, and calibrates the output of the angular velocity sensor by outputs of the angular velocity sensor obtained at the turning.

10 Claims, 4 Drawing Sheets

STRAIGHT FORWARD
DIRECTION CENTER
LINE

| TEMPERATURE | T1 | ... | T2 | ... | T3 | ... |
|---|---|---|---|---|---|---|
| INTEGRATED VALUE (TURN LEFT COUNTER-CLOCKWISE BY 180 DEGREES) | C1l | ... | C2l | ... | C3l | ... |
| INTEGRATED VALUE (TURN RIGHT CLOCKWISE BY 180 DEGREES) | C1r | ... | C2r | ... | C3r | ... |

APPARATUS FOR CONTROLLING AUTONOMOUSLY NAVIGATING UTILITY VEHICLE

CROSS-REFERENCE TO RELATED APPLICATION

This application is based upon and claims the benefit of priority from Japanese Patent Application No. 2014-172443 filed on Aug. 27, 2014, the contents of which are incorporated herein by reference.

BACKGROUND OF THE INVENTION

Field of the Invention

This invention relates to an apparatus for controlling an autonomously navigating utility vehicle that navigates autonomously in a working area, particularly to a controlling apparatus that calibrates an output of an angular velocity sensor (yaw-rate sensor, gyroscopic device) installed in the utility vehicle.

Description of Related Art

Various prior art techniques have been reported for calibrating an output of an angular velocity sensor that produces the output indicating angular velocity (yaw rate) around a center-of-gravity z-axis (vertical axis) of an autonomously navigating utility vehicle, whose time-integrating value indicates a turn angle (yaw angle) around the axis. As an example, the technique set out in Patent Document 1 (U.S. Pat. No. 8,744,663 B2) can be cited.

The technical concept of Patent Document 1 is to install a direction sensor (geomagnetic sensor) in addition to the angular velocity sensor, define a prescribed direction obtained from the output of the direction sensor as a reference, and calibrate the output of the angular velocity sensor based on a comparison of this and a direction obtained from the output of the angular velocity sensor.

SUMMARY OF THE INVENTION

In the case of an autonomously navigating utility vehicle, accurate detection of the vehicle location in the working area is important and for this the direction of vehicle advance needs to be accurately ascertained by the angular velocity sensor. However, the characteristics of an ordinary angular velocity sensor vary with sensor temperature and also differ depending on the turning direction of the utility vehicle. Moreover, perfect calibration of such characteristics is very troublesome because characteristic variance differs from one sensor to another.

This is why Patent Document 1 installs not only the angular velocity sensor but also the direction sensor (geomagnetic sensor), which is capable of higher accuracy direction detection, and calibrates the output of the angular velocity sensor by comparing the outputs of the two sensors.

However, when a high-precision sensor is added for angular velocity sensor calibration as in the teaching of Patent Document 1, a proportional increase in cost is unavoidable.

Therefore, the object of this invention is to overcome the aforesaid problem by providing an apparatus for controlling an autonomously navigating utility vehicle enabling calibration of an angular velocity sensor accurately and easily at low cost without incorporating another sensor like the direction sensor.

In order to achieve the object, this invention provides in its first aspect an apparatus for controlling operation of an autonomously navigating utility vehicle adapted to run a working area defined by a laid boundary wire autonomously to perform working, comprising: a pair of magnetic sensors installed on either sides of the vehicle at positions laterally symmetrical with respect to a straight forward direction center line of the vehicle to produce outputs indicating intensity of magnetic field of the boundary wire; an angular velocity sensor adapted to produce an output indicating angular velocity around a vertical axis of the vehicle, when the vehicle turns, whose time-integrated value indicates a turn angle around the vertical axis; and a controller that controls operation of the vehicle; wherein the controller controls the vehicle to move to a prescribed position at which an angle of the straight forward direction center line relative to a direction of the laid wire becomes a reference angle based on the outputs of the magnetic sensors, and to turn by a predetermined angle, and calibrates the output of the angular velocity sensor by the outputs of the angular velocity sensor obtained at the turning.

In order to achieve the object, this invention provides in its second aspect a method for controlling operation of an autonomously navigating utility vehicle adapted to run a working area defined by a laid boundary wire autonomously to perform working, having: a pair of magnetic sensors installed on either sides of the vehicle at positions laterally symmetrical with respect to a straight forward direction center line of the vehicle to produce outputs indicating intensity of magnetic field of the boundary wire; and an angular velocity sensor adapted to produce an output indicating angular velocity around a vertical axis of the vehicle, when the vehicle turns, whose time-integrated value indicates a turn angle around the vertical axis; and comprising the step of controlling operation of the vehicle; wherein the step of controlling controls the vehicle to move to a prescribed position at which an angle of the straight forward direction center line relative to a direction of the laid wire becomes a reference angle based on the outputs of the magnetic sensors, and to turn by a predetermined angle, and calibrates the output of the angular velocity sensor by the outputs of the angular velocity sensor obtained at the turning.

BRIEF DESCRIPTION OF THE DRAWINGS

The above and other objects and advantages will be more apparent from the following description and drawings, in which.

DETAILED DESCRIPTION OF THE INVENTION

An apparatus for controlling an autonomously navigating utility vehicle according to an embodiment of this invention is explained with reference to the attached drawings in the following.

Figure 1:
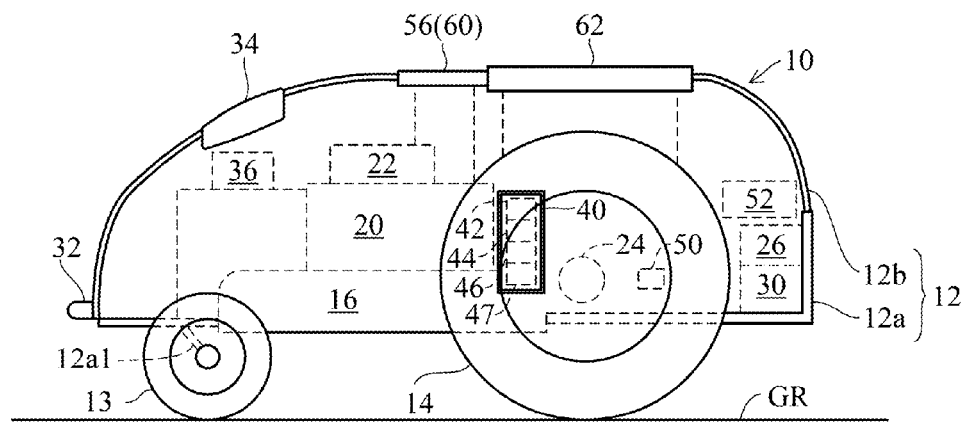
FIG. 1 is an overall conceptual diagram of an apparatus for controlling an autonomously navigating utility vehicle according to an embodiment of this invention.
Figure 2:
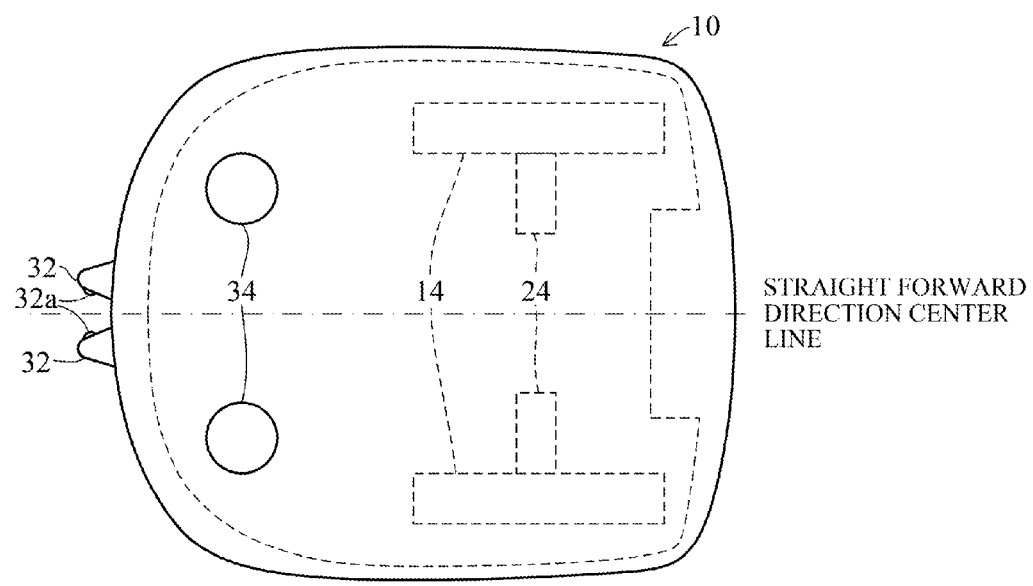
FIG. 2 is a plan view of the autonomously navigating utility vehicle shown in FIG. 1.

FIG. 1 is an overall conceptual diagram of the apparatus for controlling an autonomously navigating utility vehicle according to the embodiment, and FIG. 2 is a plan view of the autonomously navigating utility vehicle shown in FIG. 1.

As shown in FIGS. 1 and 2, reference symbol 10 designates an autonomously navigating utility vehicle, e.g., a mower; hereinafter called "utility vehicle". A body 12 of the utility vehicle 10 comprises a chassis 12a and a frame 12b attached thereto. The utility vehicle 10 is equipped with relatively small diameter left and right front wheels 13 rotatably fastened to a front end of the chassis 12a through stays 12a1 and relatively large diameter left and right rear wheels 14 rotatably fastened to the chassis 12a directly.

A work unit, e.g., a mower blade (rotary blade) 16, is attached near the middle of the chassis 12a of the utility vehicle 10, and an electric motor 20 is installed above it. The blade 16 is connected to the electric motor 20 to be driven to rotate by the electric motor (hereinafter called "work motor") 20.

A blade height regulation mechanism 22 manually operable by an operator is connected to the blade 16. The blade height regulation mechanism 22 is equipped with a screw (not shown) and configured to enable the operator to regulate the height of the blade 16 above ground level GR by manually rotating the screw.

Two electric motors (hereinafter called "travel motors") 24 are attached to the chassis 12a of the utility vehicle 10 at a rear end of the blade 16. The travel motors 24 are connected to the left and right rear wheels 14 and rotate normally (rotate to move forward) or reversely (rotate to move backward) independently on the left and right, with the front wheels 13 as non-driven wheels and the rear wheels 14 as driven wheels. The blade 16, work motor 20, travel motors 24 and so on are covered by the frame 12b.

A battery charging unit (including an AC-DC converter) 26 and a battery 30 are housed at the rear of the utility vehicle 10, and two charging terminals 32 are attached to the frame 12b so as to project forward. The charging terminals 32 have contacts 32a on their inner sides.

The charging terminals 32 are connected to the charging unit 26 through cables, and the charging unit 26 is connected to the battery 30 by cables. The work motor 20 and the travel motors 24 are configured to be powered by the battery 30 through connecting cables. The cables are not shown in FIGS. 1 and 2.

The utility vehicle 10 is thus configured as a 4-wheel, electrically-powered, autonomously navigating utility vehicle (e.g., a mower).

Left and right magnetic sensors 34 are installed at the front of the utility vehicle 10. Specifically, as shown in FIG. 2, the two magnetic sensors 34 are installed at positions laterally symmetrical with respect to a center line extending in the straight forward direction (straight forward direction center line) of the utility vehicle 10. A contact sensor 36 is attached to the frame 12b. The contact sensor 36 outputs an ON signal when the frame 12b detaches from the chassis 12a owing to contact with an obstacle or foreign object.

Figure 3:
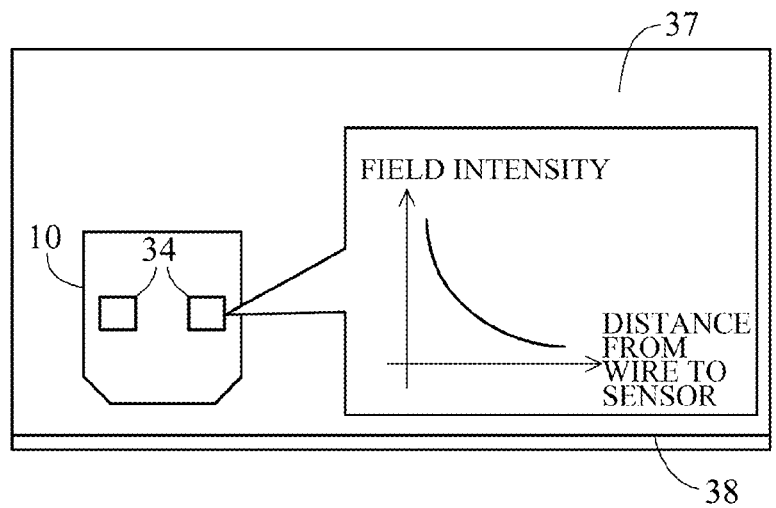
FIG. 3 is an explanatory diagram showing characteristics of a magnetic sensor shown in FIG. 1.

The characteristics of the magnetic sensors 34 will now be explained with reference to FIG. 3. FIG. 3 is an explanatory diagram showing the characteristics of the magnetic sensor 34. A working area 37 is shown only partially in FIG. 3.

Each of the magnetic sensors 34 detects intensity of a magnetic field generated by electric current passing through a boundary wire 38 marking off the working area 37. Therefore, as shown in FIG. 3, the output value of a magnetic sensor 34 mounted in the utility vehicle 10 is inversely proportional to the distance from the boundary wire 38 to the magnetic sensor 34. The boundary wire 38 comprises an electric wire that is laid under the ground and extends horizontally to define the working area 37.

As pointed out above, two magnetic sensors 34 are installed at positions laterally symmetrical with respect to the straight forward direction center line of the utility vehicle 10. Therefore, when the straight forward direction of the utility vehicle 10 and the laid direction of the boundary wire 38 intersect perpendicularly in the plane of the working area 37, i.e., when the angle of the straight forward direction of the utility vehicle 10 relative to the laid direction of the boundary wire 38 is a right angle, the outputs of the two magnetic sensors 34 exhibit equal values. On the other hand, when the angle of the straight forward direction of the utility vehicle 10 relative the laid direction of the boundary wire 38 is not the right angle, the outputs of the two magnetic sensors 34 exhibit different values.

An ECU (Electronic Control Unit) 42, which comprises a microcomputer having CPU, ROM, RAM, EEPROM and other components, is configured to be able to determine the angle of the straight forward direction center line relative to the laid direction of the boundary wire 38, based on the outputs (magnetic field intensities) obtained from the two magnetic sensors 34.

Returning to the explanation of FIGS. 1 and 2, a housing box installed near the middle of the utility vehicle 10 houses a printed circuit board 40 carrying the ECU 42, and in the vicinity thereof are installed an angular velocity sensor (yaw-rate sensor; yaw sensor) 44 that generates an output indicating angular velocity (yaw-rate) around a center-of-gravity z-axis (vertical axis) of the utility vehicle 10 (whose time-integrated value indicates a turn angle around the vertical axis), a G sensor (acceleration sensor) 46 that generates an output indicating acceleration G acting on the utility vehicle 10 in x, y and z (3-axis) directions, and a temperature sensor 47 that produces an output indicating ambient temperature of the angular velocity sensor 44 and the utility vehicle 10.

Figure 4:
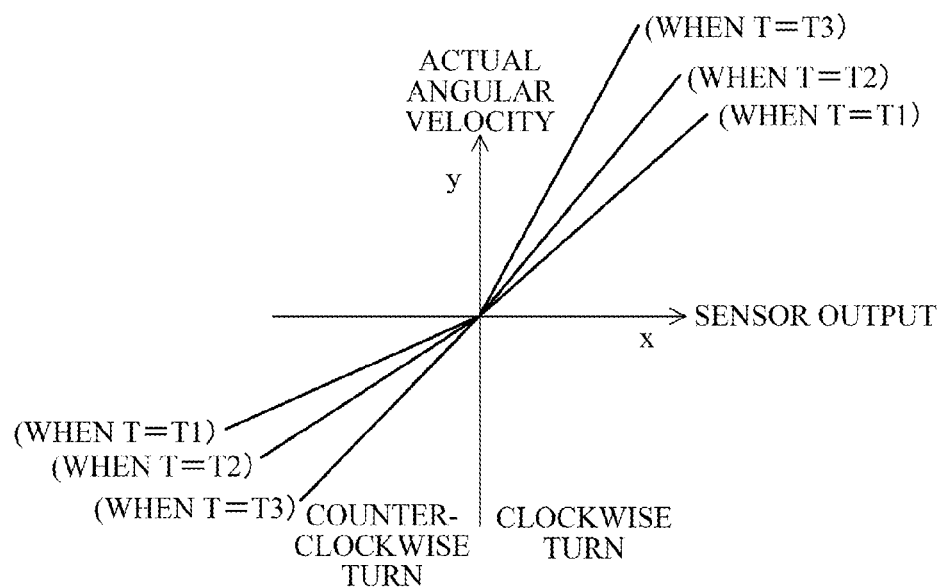
FIG. 4 is an explanatory diagram showing temperature characteristics of an angular velocity sensor shown in FIG. 1.

Characteristics of the angular velocity sensor 44 and the object of the present invention attributable thereto will now be explained with reference to FIG. 4. FIG. 4 is an explanatory diagram showing the temperature characteristics of the angular velocity sensor 44.

As clear from FIG. 4, output value X produced from the angular velocity sensor 44 and value Y of the actual angular velocity (true angular velocity) exhibit a relation of 1:1 when sensor temperature T is a specified value (T=T1), but this correlation is known to vary as the sensor temperature T varies.

Moreover, the characteristics also differ with turning direction of the utility vehicle 10 as well as from one sensor to another, so that accurate detection of angular velocity requires each sensor to be tested individually and the output of the angular velocity sensor 44 to be calibrated in accordance with the so-ascertained temperature characteristics. As it is very troublesome to carry out these procedures on every sensor, the object of this embodiment is, as will be discussed in the following, to provide an apparatus that accurately and easily calibrates the output of the angular velocity sensor 44.

Similarly to in the case of the ordinary angular velocity sensor, as mentioned above, the ECU 42 determines or detects the turn angle (yaw angle) of the utility vehicle 10 around the vertical axis by time-integrating angular velocity data obtained from the angular velocity sensor 44. As will be explained later, the ECU 42 is equipped with tables (maps) to be used to store the time-integrated values for respective temperatures for each turning direction (clockwise or counterclockwise).

Returning again to the explanation of FIGS. 1 and 2, wheel speed sensors 50 installed near the rear wheels (driven wheels) 14 produce outputs indicating the wheel speeds of the rear wheels 14, and a lift sensor 52 installed between the chassis 12a and the frame 12b outputs an ON signal when the frame 12b is lifted off the chassis 12a by the operator or other worker. The utility vehicle 10 is equipped with a main switch 56 and an emergency stop switch 60 both operable by the operator.

The outputs of the magnetic sensors 34, contact sensor 36, angular velocity sensor 44, G sensor 46, temperature sensor 47, wheel speed sensors 50, lift sensor 52, main switch 56, and emergency stop switch 60 are sent to the ECU 42.

The top of the frame 12b of the utility vehicle 10 has a large cutaway in which a display 62 is fitted. The display 62 is connected to the ECU 42 and displays working modes and the like in accordance with commands from the ECU 42.

The work (mowing work) of the utility vehicle 10 configured in the aforesaid manner will be explained. The operator uses the blade height regulation mechanism 22 to manually regulate the height of the blade 16 in accordance with the growth condition of lawn in the working area 37 and turns ON the main switch 56, causing it to output an ON signal, whereupon the ECU 42 boots up, a working mode is established, and lawn mowing work is commenced in accordance with programs stored in the ROM.

In the working mode, the ECU 42 drives the utility vehicle 10 by controlling operation of the travel motors 24 to regulate the vehicle speed detected from the wheel speed sensors 50 to a predetermined value, and puts the blade 16 to work by controlling operation of the work motor 20 to regulate the rotational speed of the blade 16 to a predetermined value.

More specifically, in the working mode the ECU 42 controls the utility vehicle 10 to service (mow) the working area 37 by driving it randomly or in line with a predetermined program, and upon determining from the output of the magnetic sensors 34 that the utility vehicle 10 has gone outside the working area 37, the ECU 42 controls the utility vehicle 10 to return toward the inside of the working area 37 by changing the direction of advance detected from the output of the angular velocity sensor 44 by a predetermined angle.

Figure 5:
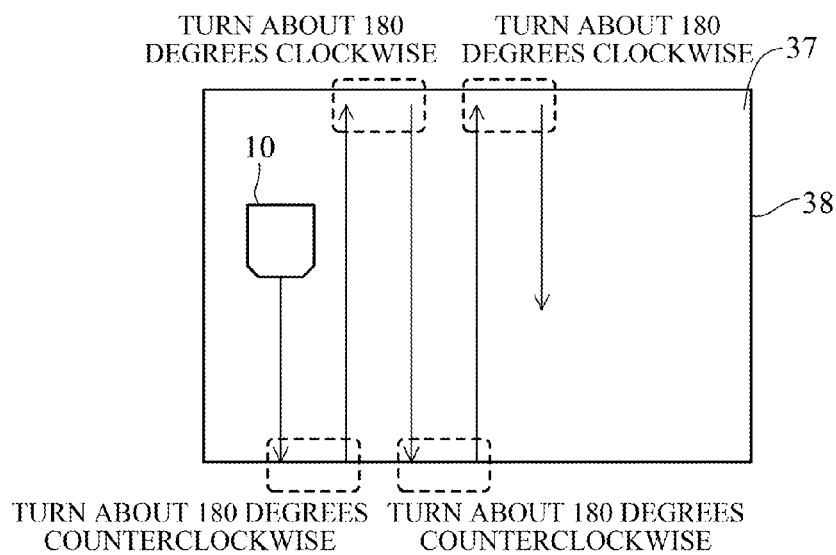
FIG. 5 is an explanatory diagram for explaining how the autonomously navigating utility vehicle works in a working area.
Figure 6A:
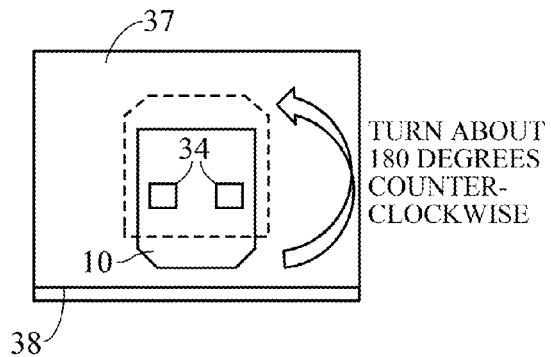
FIGS. 6A and 6B are similar explanatory diagrams as FIG. 5 for explaining how the autonomously navigating utility vehicle works.
Figure 6B:
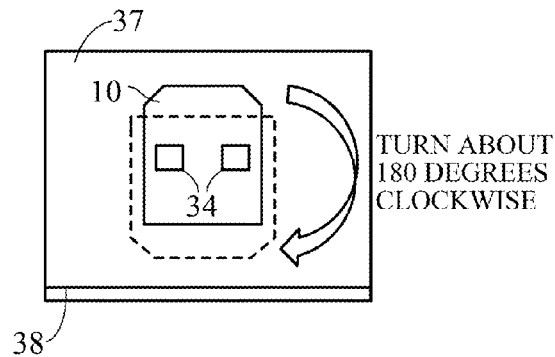

FIG. 5 is an explanatory diagram for explaining how the utility vehicle 10 mows the working area 37, and FIGS. 6A and 6B are an explanatory diagram for explaining turning action of the utility vehicle 10.

As illustrated, in this embodiment of the invention, the ECU 42 operates the utility vehicle 10 to repeatedly traverse and mow the entire working area 37. Specifically, the utility vehicle 10 is driven straight ahead in a certain direction within the working area 37 until it arrives at the periphery of the working area 37 marked off by the boundary wire 38 and is then turned about (reversed) 180 degrees clockwise or counterclockwise and is once more driven straight ahead but in the opposite direction, whereafter this operating procedure is repeated until the entire working area 37 has been mowed.

As the configuration enables the left and right rear wheels (driven wheels) 14 to be driven forward and backward independently by the travel motors 24, the utility vehicle 10 goes straight ahead when the left and right travel motors 24 are rotated at the same speed and turns in the direction of slower rotation when they are rotated at different speeds. When one of the left and right travel motors 24 is rotated forward and the other backward, the utility vehicle 10 does turn, e.g., does turn 180 degrees (so-called "pivot turn"), as shown in FIGS. 6A and 6B.

When the utility vehicle 10 turns, the turn angle (yaw angle) is ordinarily determined or detected based on the time-integrated outputs of the angular velocity sensor 44. Therefore, in order for the utility vehicle 10 to continue mowing while repeating the straight-ahead and reversal (turnabout) actions as planned, it is necessary to accurately ascertain the direction of utility vehicle 10 advance, in other words to detect the travel direction of the utility vehicle 10 with high accuracy by means of the angular velocity sensor 44.

However, as was explained with reference to FIG. 4, the susceptibility of the angular velocity sensor 44 to sensor temperature makes it necessary for accurately ascertaining the travel direction of utility vehicle 10 to calibrate the output of the angular velocity sensor 44 independently through testing in advance. Otherwise, a high-precision direction sensor such as a geomagnetic sensor has to be provided and the angular velocity sensor 44 be calibrated by comparing the outputs of the two sensors.

On the other hand, when the utility vehicle 10 executes the pivot turn (180 degrees turn) shown in FIGS. 6A and 6B, the turn angle can be accurately detected using the signal obtained from the magnetic sensors 34.

Specifically, the fact that, as pointed out above, the two magnetic sensors 34 exhibit equal output values in magnetic field intensities when the angle of the straight forward direction center line of the utility vehicle 10 relative to the laid direction of the boundary wire 38 becomes the right angle (reference angle) can be utilized when the utility vehicle 10 comes near the boundary wire 38 to suitably drive the left and right rear wheels 14 of the utility vehicle 10 to first move the utility vehicle 10 to the prescribed position at which the magnetic field intensities obtained from the two magnetic sensors 34 become equal values (move the utility vehicle 10 to the prescribed position facing the boundary wire 38 at the right angle).

Next, by pivot-turning the utility vehicle 10 clockwise and/or counterclockwise from this condition and stopping it at a position where the magnetic field intensities obtained from the magnetic sensors 34 again become equal values, the fact that the utility vehicle 10 was actually turned 180 degrees can be accurately ascertained independently of the turn angle detected by the angular velocity sensor 44, more precisely independently of the angle calculated from the time-integrated value of the outputs of the angular velocity sensor 44.

Therefore, without any need to additionally install a geomagnetic sensor or the like, by moving the utility vehicle 10 to perform the predetermined operations, the angular velocity sensor 44 can be accurately calibrated based on the reference angle (right angle) at this time.

Of particular note is that in this embodiment of the invention, as explained with reference to FIG. 5, the utility vehicle 10 is repeatedly turned 180 degrees near the surrounding boundary wire 38 during ordinary mowing work, so that calibration of the angular velocity sensor 44 can be performed simultaneously at the time the turning action. The inventors achieved the invention of this application based on this knowledge.

Figures 7, 8:
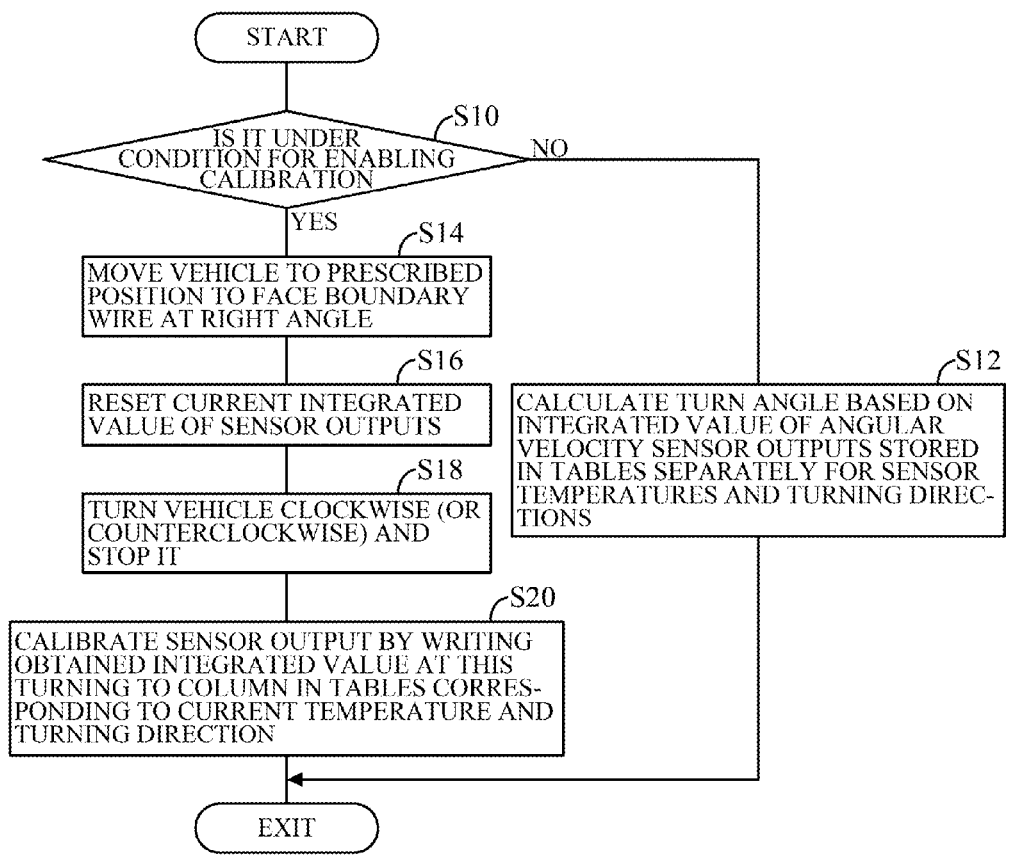
FIG. 7 is a flowchart showing operation of an apparatus shown in FIG. 1.
FIG. 8 is an explanatory diagram showing tables that stores characteristics of the angular velocity sensor.

FIG. 7 is a flowchart showing the aforesaid operation of the ECU 42, specifically the calibration processing of the angular velocity sensor 44 by the ECU 42. The illustrated processing is repeatedly executed at predetermined intervals during driving of the utility vehicle 10. FIG. 8 is an explanatory diagram showing characteristics of tables (maps) stored in the memory such as the EEPROM of the ECU 42 and used in the processing of the FIG. 7 flowchart.

Now to explain, the program begins at S10, in which the ECU 42 determines whether the angular velocity sensor 44 is in a condition enabling calibration (S: processing Step). As explained above, in order to perform calibration of the angular velocity sensor 44 in this embodiment, the utility vehicle 10 needs to be near the boundary wire 38, so the determination in S10 is made based on at least the positional relationship between the utility vehicle 10 and the boundary wire 38.

When the result in S10 is NO, i.e., when it is found that the utility vehicle 10 has not reached the periphery at the boundary wire 38, the program proceeds to S12, in which the turn angle of the utility vehicle 10 is determined or detected based the time-integrated values (of the angular velocity sensor 44 stored in the tables shown in FIG. 8) corresponding to the current temperature obtained from the temperature sensor 47 and corresponding to the current direction of the vehicle turning (i.e., clockwise or counterclockwise).

Since the number of temperatures stored in the tables are limited at the beginning of the calibration, the turn angle is often determined by interpolating values of an adjacent temperature stored in the tables.

On the other hand, when the determination in S10 is YES, the program proceeds to S14, in which the rear wheels 14 are driven to move the utility vehicle 10 to the prescribed position at which the angle of the straight forward direction center line relative to the direction of the laid boundary wire 38 becomes the reference angle (90 degrees).

The program next proceeds to S16, in which a current time-integrated value of the outputs of the angular velocity sensor 44 is reset (initialized) to zero when the utility vehicle 10 moved to the prescribed position, and to S18, in which, as explained above, the utility vehicle 10 is controlled to turn clockwise (or counterclockwise) a prescribed angle (i.e., 180 degrees) based on the outputs of the magnetic sensors 34, and is stopped.

The program then proceeds to S20, in which the output of the angular velocity sensor 44 is calibrated. Specifically, the sensor integrated value obtained by time-integrating the outputs of the angular velocity sensor 44 at this clockwise (or counterclockwise) turning is written in the tables (shown in FIG. 8) at a column corresponding to a current temperature obtained from the temperature sensor 47 and the direction of current turning (clockwise (or counterclockwise)).

When any data whose temperature is corresponding to the current temperature and whose direction of turning is corresponding to the current turning has already been stored in a column of the tables shown in FIG. 8, the obtained sensor integrated value is used to overwrite the data.

The selection of clockwise turn or counterclockwise turn in S16 and S18 is intrinsically determined by the work program of the utility vehicle 10. Specifically, as shown in FIG. 5, clockwise turn and counterclockwise turn of the utility vehicle 10 is determined by the position and direction of advance of the utility vehicle 10 in the working area 37, and the work procedure (work program), so that the selection in S16 and S18 is made in accordance with the relevant conditions.

In the above, alternatively, both clockwise turn and counterclockwise turn can be executed consecutively, so that the angular velocity sensor 44 is calibrated at every execution of the processing of FIG. 7.

Further, although calibrating the angular velocity sensor 44 every time the utility vehicle 10 turns at the periphery at the boundary wire 38 enables high-accuracy calibration of the angular velocity sensor 44, a contrary aspect is that the time required for this work is a proportionally longer and working efficiency is degraded. So S10 can be defined to make a YES determination to a limited time of the operation of the utility vehicle 10, i.e., to a limited time independently of performing the working.

For example, it can be limited only immediately after the utility vehicle 10 leaves a charging station (not shown) or immediately before it returns to the charging station after the work is finished (or suspended). Alternatively, S10 can be defined to make a YES determination only when the sensor temperature obtained by the temperature sensor 47 falls in a temperature range for which there is no calibration history.

As stated above, the embodiment is configured to have an apparatus and method for controlling operation of an autonomously navigating utility vehicle (10) adapted to run a working area (37) defined by a laid boundary wire (38) autonomously to perform working, comprising: a pair of magnetic sensors (34) installed on either sides of the vehicle (10) at positions laterally symmetrical with respect to a straight forward direction center line of the vehicle (10) to produce outputs indicating intensity of magnetic field of the boundary wire (38); an angular velocity sensor (44) adapted to produce an output indicating angular velocity around a vertical axis of the vehicle (10), when the vehicle (10) turns, whose time-integrated value indicates a turn angle around the vertical axis; and a controller (42) that controls operation of the vehicle (10); wherein the controller controls the vehicle (10) to move to a prescribed position at which an angle of the straight forward direction center line relative to a direction of the laid wire (38) becomes a reference angle based on the outputs of the magnetic sensors (34), and to turn by a predetermined angle, and calibrates the output of the angular velocity sensor (44) by the outputs of the angular velocity sensor (44) obtained at the turning (S10-S20).

With this, the angular velocity sensor 44 can be easily calibrated accurately and simply or at low cost without incorporating an additional sensor like the direction sensor. Behind this is the fact that in order to navigate autonomously the utility vehicle 10 that navigates within the boundary wire-delineated working area 37 intrinsically requires as an indispensable constituent magnetic sensors 34 for detecting intensity of magnetic fields generated by the boundary wire 38, so that the angular velocity sensor 44 can be accurately and easily calibrated at low cost without incorporating an additional sensor like the direction sensor.

To be more specific, the sensor calibration in the embodiment is made by preparing tables with columns for different temperatures and different turning directions are first prepared and the tables are to be filled with data successively at every pivot turn in a learning-control-like manner. With this, it becomes possible to calibrate the angular velocity sensor 44 accurately even when the sensor performance becomes degraded by aging. Also, it becomes possible to calibrate the sensor 44 easily since no experimental preparation like that shown in FIG. 4 is no longer needed.

In the apparatus and method, the controller resets the time-integrated value of the outputs of the angular velocity sensor (44) when the vehicle (10) moved to the prescribed position, controls the vehicle (10) to turn 180 degrees as the predetermined angle, and calibrates the output of the angular velocity sensor (44) by the outputs of the angular velocity sensor (44) obtained at the turning.

With this, the angular velocity sensor 44 can be accurately and easily calibrated. Specifically, by moving the vehicle to take a suitable positional relationship between the boundary wire 38 and the utility vehicle 10 and on the spot turning the utility vehicle 10 by the predetermined angle, predefined output characteristics of the angular velocity sensor 44 can be calibrated by the value obtained by time-integrating sensor outputs actually outputted from the angular velocity sensor at that time, thus enabling accurate and easy calibration of the angular velocity sensor.

The apparatus further includes: a temperature sensor (47) installed at the vehicle (10) to produce a temperature of the angular velocity sensor (44), and tables adapted to store the outputs of the angular velocity sensor (44) for respective temperatures and for respective direction of the turning; and the controller calibrates one from among the stored outputs of the angular sensor (44) that is corresponding to a temperature detected by the temperature sensor at the turning. With this, the angular velocity sensor 44 can be accurately and easily calibrated.

Further, in the apparatus, the controller calibrates the output of the angular velocity sensor (44) while performing the working. With this, the angular velocity sensor 44 can be more accurately calibrated.

Further, in the apparatus the controller calibrates the output of the angular velocity sensor (44) independently of performing the working. With this, the angular velocity sensor 44 can be calibrated without degrading working efficiency.

It should be noted in the above that, although the utility vehicle 10 is explained as a mower with reference to FIGS. 1 and 2, it should not be limited thereto.

It should further be noted that the reference angle is explained as 90 degrees and the predetermined angle 180 degrees. However, the invention is based on the finding that the turn angle can be determined based on the angle of the vehicle straight forward direction center line relative to a direction of the laid wire 38 based on the outputs of the magnetic sensors 34 installed on either sides of the vehicle 10 at positions laterally symmetrical with respect to the straight forward direction center line of the vehicle 10. Accordingly, the reference angle and/or the predetermined angle should not be limited thereto and they can be appropriately changed based on contour or form of the working area 37.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for controlling operation of an autonomously navigating utility vehicle adapted to run a working area defined by a laid boundary wire autonomously to perform working, comprising:
   a pair of magnetic sensors installed on either sides of the vehicle at positions laterally symmetrical with respect to a straight forward direction center line of the vehicle to produce outputs indicating intensity of magnetic field of the boundary wire;
   an angular velocity sensor adapted to produce an output indicating angular velocity around a vertical axis of the vehicle, when the vehicle turns, whose time-integrated value indicates a turn angle around the vertical axis; and
   a controller that controls operation of the vehicle;
   wherein the controller controls the vehicle to move to a prescribed position at which an angle of the straight forward direction center line relative to a direction of the laid wire becomes a reference angle based on the outputs of the magnetic sensors, and to turn by a predetermined angle, and calibrates the output of the angular velocity sensor by the outputs of the angular velocity sensor obtained at the turning.

2. The apparatus according to claim 1, wherein the controller resets the time-integrated value of the outputs of the angular velocity sensor when the vehicle moved to the prescribed position, controls the vehicle to turn 180 degrees as the predetermined angle, and calibrates the output of the angular velocity sensor by the outputs of the angular velocity sensor obtained at the turning.

3. The apparatus according to claim 1, further including:
   a temperature sensor installed at the vehicle to produce a temperature of the angular velocity sensor, and
   tables adapted to store the outputs of the angular velocity sensor for respective temperatures and for respective direction of the turning;
   and the controller calibrates one from among the stored outputs of the angular sensor that is corresponding to a temperature detected by the temperature sensor at the turning.

4. The apparatus according to claim 1, wherein the controller calibrates the output of the angular velocity sensor while performing the working.

5. The apparatus according to claim 1, wherein the controller calibrates the output of the angular velocity sensor independently of performing the working.

6. A method for controlling operation of an autonomously navigating utility vehicle adapted to run a working area defined by a laid boundary wire autonomously to perform working, having:
   a pair of magnetic sensors installed on either sides of the vehicle at positions laterally symmetrical with respect to a straight forward direction center line of the vehicle to produce outputs indicating intensity of magnetic field of the boundary wire; and
   an angular velocity sensor adapted to produce an output indicating angular velocity around a vertical axis of the vehicle, when the vehicle turns, whose time-integrated value indicates a turn angle around the vertical axis;
   and comprising the step of controlling operation of the vehicle;
   wherein the step of controlling controls the vehicle to move to a prescribed position at which an angle of the straight forward direction center line relative to a direction of the laid wire becomes a reference angle based on the outputs of the magnetic sensors, and to turn by a predetermined angle, and calibrates the output of the angular velocity sensor by the outputs of the angular velocity sensor obtained at the turning.

7. The method according to claim 6, wherein the step of controlling resets the time-integrated value of the outputs of the angular velocity sensor when the vehicle moved to the prescribed position, controls the vehicle to turn 180 degrees as the predetermined angle, and calibrates the output of the angular velocity sensor by the outputs of the angular velocity sensor obtained at the turning.

8. The method according to claim 6, further including:
a temperature sensor installed at the vehicle to produce a temperature of the angular velocity sensor, and
tables adapted to store the outputs of the angular velocity sensor for respective temperatures and for respective direction of the turning;
and the step of controlling calibrates one from among the stored outputs of the angular sensor that is corresponding to a temperature detected by the temperature sensor at the turning.

9. The method according to claim 6, wherein the step of controlling calibrates the output of the angular velocity sensor while performing the working.

10. The method according to claim 6, wherein the step of controlling calibrates the output of the angular velocity sensor independently of performing the working.

* * * * *